(12) United States Patent
Tomita et al.

(10) Patent No.: US 12,039,866 B2
(45) Date of Patent: Jul. 16, 2024

(54) DISPLAY UNIT FOR ROAD MACHINE

(71) Applicant: SUMITOMO CONSTRUCTION MACHINERY CO., LTD., Tokyo (JP)

(72) Inventors: Yukihiro Tomita, Chiba (JP); Nobuyuki Baba, Chiba (JP)

(73) Assignee: SUMITOMO CONSTRUCTION MACHINERY CO., LTD., Tokyo (JP)

(*) Notice: Subject to any disclaimer, the term of this patent is extended or adjusted under 35 U.S.C. 154(b) by 377 days.

(21) Appl. No.: 17/448,403

(22) Filed: Sep. 22, 2021

(65) Prior Publication Data

US 2022/0005350 A1 Jan. 6, 2022

Related U.S. Application Data

(63) Continuation of application No. PCT/JP2020/013079, filed on Mar. 24, 2020.

(30) Foreign Application Priority Data

Mar. 25, 2019 (JP) .................................. 2019-057337

(51) Int. Cl.
*E01C 19/00* (2006.01)
*E01C 19/48* (2006.01)
(Continued)

(52) U.S. Cl.
CPC ..... *G08G 1/096716* (2013.01); *E01C 19/004* (2013.01); *E01C 19/48* (2013.01);
(Continued)

(58) Field of Classification Search
CPC ........ E01C 19/004; E01C 19/48; E01C 19/00; E01C 19/002; E01C 19/07; G08G 1/096716
See application file for complete search history.

(56) References Cited

U.S. PATENT DOCUMENTS 5,201,603 A * 4/1993 Bassett ................... E01C 19/48
404/96
5,942,679 A 8/1999 Sandstrom
(Continued)

FOREIGN PATENT DOCUMENTS

JP S63-121606 8/1988
JP H04-097911 3/1992
(Continued)

OTHER PUBLICATIONS

International Search Report for PCT/JP2020/013079 mailed on Jun. 2, 2020.

*Primary Examiner* — Tadesse Hailu
(74) *Attorney, Agent, or Firm* — IPUSA, PLLC

(57) ABSTRACT

A display unit for a road machine includes a display and processing circuitry. The road machine includes a tractor, a hopper installed in front of the tractor to receive a paving material, a conveyor configured to feed the paving material in the hopper to the back side of the tractor, a screw configured to lay and spread the paving material fed by the conveyor behind the tractor, a screed configured to lay and level the paving material laid and spread by the screw behind the screw, and an information obtaining device configured to obtain information on road pavement. The processing circuitry of the display unit is configured to predict a future event based on the information on the road pavement obtained by the information obtaining device, and to display information on the event on a road map on the display.

10 Claims, 6 Drawing Sheets

(51) Int. Cl.
*G08G 1/0967* (2006.01)
*E01C 23/07* (2006.01)
(52) U.S. Cl.
CPC ............ *E01C 19/00* (2013.01); *E01C 19/002* (2013.01); *E01C 23/07* (2013.01)

(56) References Cited

U.S. PATENT DOCUMENTS

| | | | | |
|---|---|---|---|---|
| 10,745,867 | B2* | 8/2020 | Weber | E01C 19/004 |
| 11,275,364 | B2* | 3/2022 | Marsolek | G06F 3/04847 |
| 2009/0142133 | A1* | 6/2009 | Glee | E01C 19/48 |
| | | | | 404/90 |
| 2012/0012738 | A1 | 1/2012 | Shinada et al. | |
| 2012/0321385 | A1* | 12/2012 | Hanfland | G01B 21/08 |
| | | | | 404/84.1 |
| 2015/0199576 | A1* | 7/2015 | Ichikawa | G06T 3/4038 |
| | | | | 382/104 |
| 2016/0032540 | A1* | 2/2016 | Reda | E01C 19/185 |
| | | | | 404/75 |
| 2016/0115654 | A1 | 4/2016 | Pedersen et al. | |
| 2017/0058467 | A1 | 3/2017 | Marsolek et al. | |
| 2017/0282983 | A1* | 10/2017 | Guntert, Jr. | B62D 55/065 |
| 2018/0066404 | A1* | 3/2018 | Herzberg | E01C 19/20 |
| 2018/0079271 | A1* | 3/2018 | Zwanzger | B60G 17/08 |
| 2018/0127929 | A1* | 5/2018 | Pinson | E01C 19/48 |
| 2018/0142427 | A1* | 5/2018 | Tkachenko | G05D 1/021 |
| 2018/0218596 | A1* | 8/2018 | Castelli | H04L 67/52 |
| 2019/0106846 | A1 | 4/2019 | Marsolek et al. | |
| 2019/0186084 | A1* | 6/2019 | Marsolek | E01C 19/48 |
| 2019/0338473 | A1 | 11/2019 | Buschmann et al. | |

FOREIGN PATENT DOCUMENTS

| | | |
|---|---|---|
| JP | H04-179713 | 6/1992 |
| JP | H04-319105 | 11/1992 |
| JP | H06-065804 | 8/1994 |
| JP | H08-510807 | 11/1996 |
| JP | H11-310904 | 11/1999 |
| JP | 2000-110111 | 4/2000 |
| JP | 2012-022154 | 2/2012 |
| JP | 2017-167046 | 9/2017 |
| JP | 2019-203374 | 11/2019 |
| WO | 2017/123984 | 7/2017 |

* cited by examiner

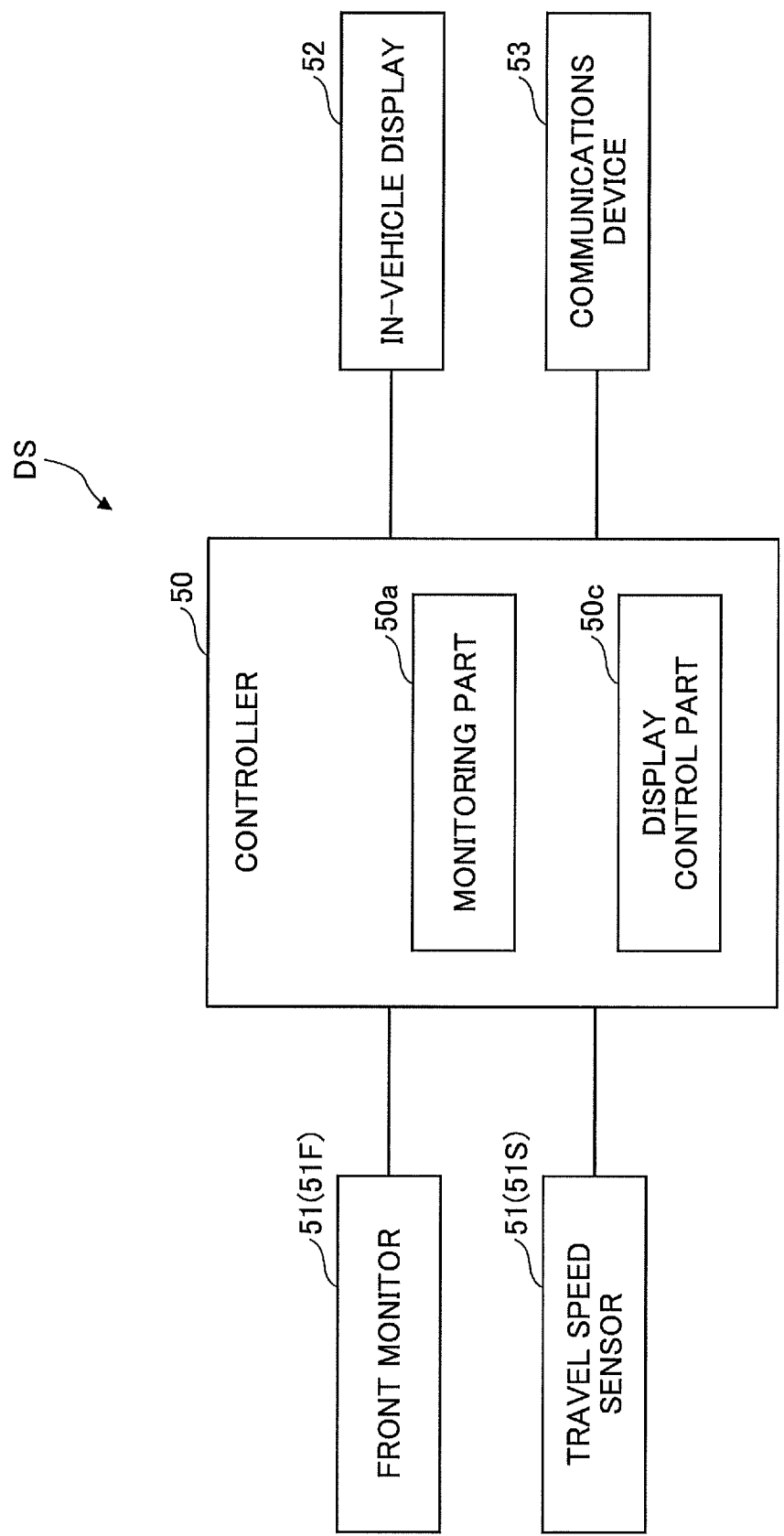

DISPLAY UNIT FOR ROAD MACHINE

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2020/013079, filed on Mar. 24, 2020 and designating the U.S., which claims priority to Japanese Patent Application No. 2019-057337, filed on Mar. 25, 2019. The entire contents of the foregoing applications are incorporated herein by reference.

BACKGROUND

Technical Field

The present disclosure relates to display units for road machines.

Description of Related Art

An asphalt finisher that calculates the amount of a material mixture necessary for finishing an unconstructed pavement based on the pavement distance and pavement width of and the amount of a material mixture used for a newly constructed pavement and on the pavement distance and pavement width of the unconstructed pavement and displays the amount of the material mixture on a display has been known. The newly constructed pavement is a finished part of a road to be newly paved, and the unconstructed pavement is a part yet to be finished of the road to be newly paved.

An operator of this asphalt finisher can immediately and accurately determine the amount of a material mixture necessary for finishing the unconstructed pavement from the contents of display of the display and finish paving the road by ordering an appropriate amount of the material mixture.

SUMMARY

According to an aspect of the present invention, a display unit for a road machine includes a display and processing circuitry. The road machine includes a tractor, a hopper installed in front of the tractor to receive a paving material, a conveyor configured to feed the paving material in the hopper to the back side of the tractor, a screw configured to lay and spread the paving material fed by the conveyor behind the tractor, a screed configured to lay and level the paving material laid and spread by the screw behind the screw, and an information obtaining device configured to obtain information on road pavement. The processing circuitry of the display unit is configured to predict a future event based on the information on the road pavement obtained by the information obtaining device, and to display information on the event on a road map on the display.

BRIEF DESCRIPTION OF THE DRAWINGS

FIG. 6 is a diagram illustrating another example configuration of the display system.

DETAILED DESCRIPTION

The operator of the related-art asphalt finisher may be unable to accurately predict the future progress of laying and leveling work with the determination of the amount of a material mixture necessary for finishing the unconstructed pavement alone.

In view of the above, it is desired to provide a display unit for a road machine that enables a relevant person such as an operator of an asphalt finisher or a worker working around the asphalt finisher to more accurately predict the progress of laying and leveling work.

According to an aspect of the present invention, a display unit for a work machine that enables a relevant person to more accurately predict the progress of laying and leveling work is provided.

Figure 1:
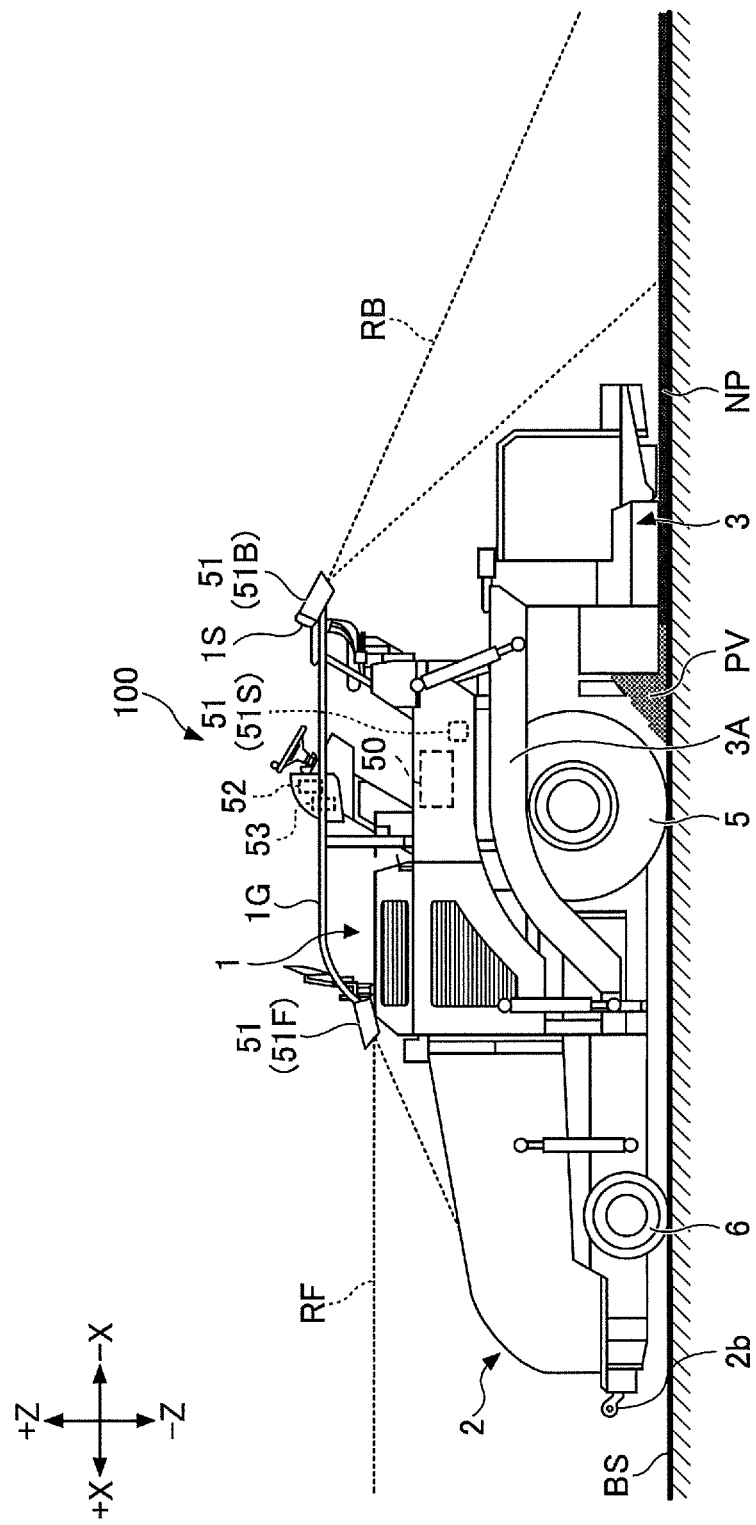
FIG. 1 is a side view of an asphalt finisher according to an embodiment of the present invention.
Figure 2:
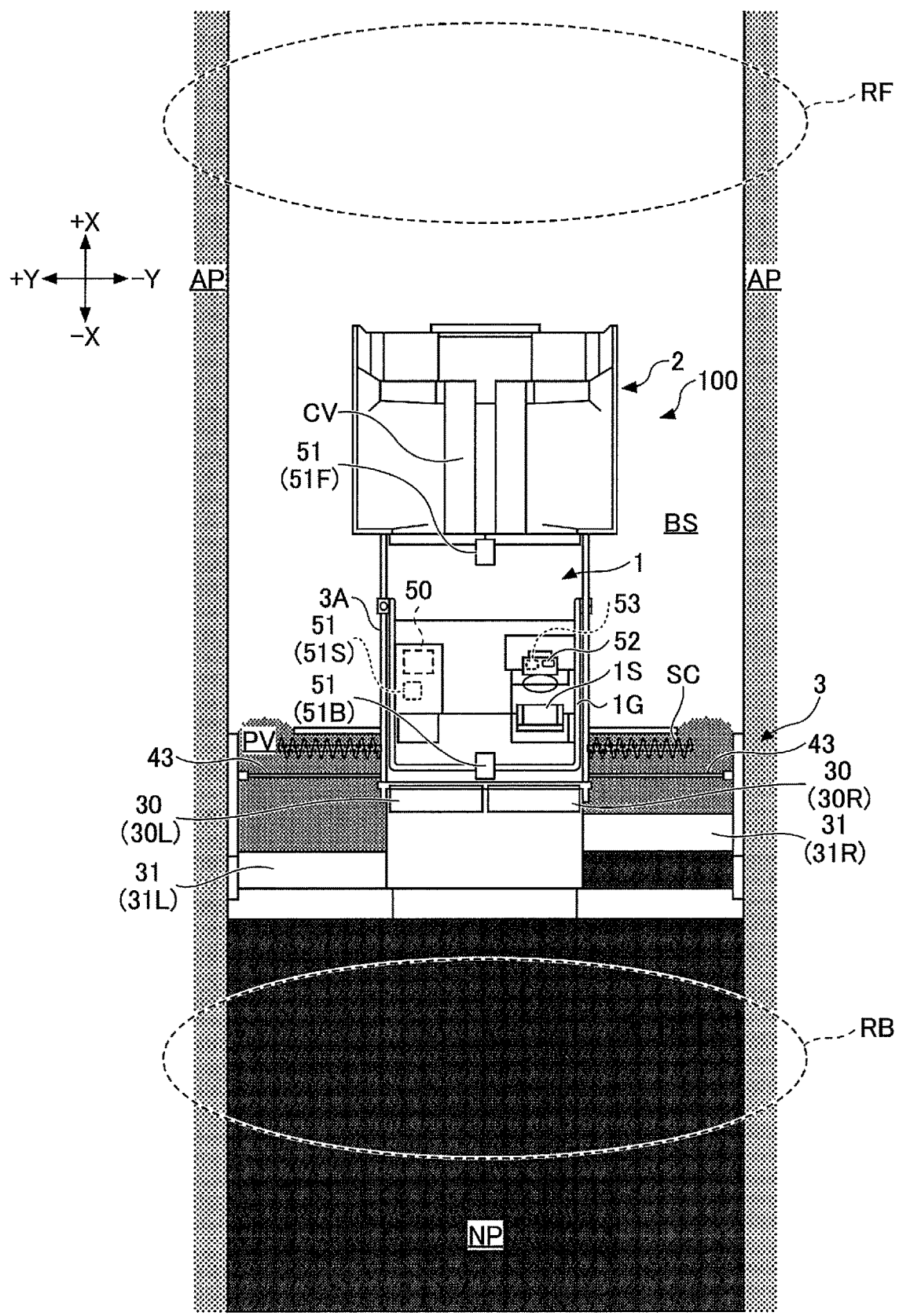
FIG. 2 is a plan view of the asphalt finisher of FIG. 1.

FIG. 1 is a side view of an asphalt finisher 100 that is an example of a road machine according to an embodiment of the present invention. FIG. 2 is a plan view of the asphalt finisher 100. The asphalt finisher 100 is constituted mainly of a tractor 1, a hopper 2, and a screed 3. In the following, the direction of the hopper 2 as viewed from the tractor 1 (the +X direction) is defined as a forward direction, and the direction of the screed 3 as viewed from the tractor 1 (the −X direction) is defined as a backward direction. The road machine may also be a base paver, a tack paver, a multi asphalt paver, or the like.

The tractor 1 is a mechanism for moving the asphalt finisher 100. According to this embodiment, the tractor 1 rotates rear wheels 5 using a rear wheel travel hydraulic motor and rotates front wheels 6 using a front wheel travel hydraulic motor to move the asphalt finisher 100. The rear wheel travel hydraulic motor and the front wheel travel hydraulic motor are supplied with hydraulic oil from a hydraulic pump to rotate. The rear wheels 5 and the front wheels 6 may be replaced with crawlers. The travel motors may also be electric motors.

A controller 50 (control device) is processing circuitry that controls the asphalt finisher 100. According to this embodiment, the controller 50 is constituted of a microcomputer that includes a CPU, a memory, and a nonvolatile storage, and is mounted on the tractor 1. The CPU executes programs stored in the nonvolatile storage to implement functions of the controller 50. Functions of the controller 50 may also be configured of hardware or firmware.

The hopper 2 is a mechanism for receiving a paving material. According to this embodiment, the hopper 2 is installed in front of the tractor 1 and is configured to be openable and closable in the vehicle width directions (the Y-axis directions) by hopper cylinders. Normally, the asphalt finisher 100 fully opens the hopper 2 to receive a paving material (such as an asphalt mixture) from the bed of a dump truck. The dump truck is an example of a transporter vehicle that transports a paving material. FIGS. 1 and 2 illustrate the hopper 2 in a fully opened state. When the paving material in the hopper 2 decreases, the hopper 2 is closed and the paving material near the inner wall of the hopper 2 is gathered around the center of the hopper 2, so that a conveyor CV in the center of the hopper 2 can feed the paving material to the back side of the tractor 1. The paving material fed to the back side of the tractor 1 is laid and spread in the vehicle width directions behind the tractor 1 and in front of the screed 3 with a screw SC. According to this embodiment, the screw SC has extension screws laterally coupled. In FIGS. 1 and 2, a paving material PV laid and spread by the screw SC is indicated by a dot pattern.

The screed 3 is a mechanism for laying and leveling the paving material PV. According to this embodiment, as illustrated in FIG. 2, the screed 3 includes front screeds 30 and rear screeds 31. The front screeds 30 includes a left front screed 30L and a right front screed 30R. The rear screeds 31 include a left rear screed 31L and a right rear screed 31R. The screed 3 is a floating screed towed by the tractor 1, and is coupled to the tractor 1 through leveling arms 3A.

Mold boards 43 are attached to the front of the screed 3. The mold boards 43 are configured to be able to adjust the amount of the paving material PV accumulated in front of the screed 3. The paving material PV passes through a gap between the lower ends of the mold boards 43 and a roadbed BS to be below the screed 3.

An information obtaining device 51 is attached to the tractor 1. The information obtaining device 51 is configured to be able to obtain information on road pavement and output the obtained information to the controller 50. The information on road pavement includes at least one of information on a newly constructed pavement, information on an unconstructed pavement, and weather information. According to this embodiment, the information obtaining device 51 includes a front monitor 51F, a back monitor 51B, and a travel speed sensor 51S.

The front monitor 51F is configured to be able to monitor an area in front of the asphalt finisher 100. According to this embodiment, the front monitor 51F is a LIDAR whose monitoring range RF is a space in front of the tractor 1, and is attached to the center of the front end of the upper surface of the tractor 1. The front monitor 51F, however, may be attached to another part of the asphalt finisher 100.

The back monitor 51B is configured to be able to monitor an area behind the asphalt finisher 100. According to this embodiment, the back monitor 51B is a LIDAR whose monitoring range RB is a space behind the screed 3, and is attached to a guide rail 1G serving as a handrail for an operator of the asphalt finisher 100. The back monitor 51B, however, may be attached to a lower part of an operator seat 1S or may be another part of the asphalt finisher 100.

The information obtaining device 51 may include a side monitor configured to be able to monitor an area to the side of the asphalt finisher 100. In this case, the side monitor may be attached to, for example, the left end of the upper surface of the tractor 1 on the front side of the rear wheels 5 as a LIDAR whose monitoring range is a space to the left of the tractor 1. The side monitor may also be attached to, for example, the right end of the upper surface of the tractor 1 on the front side of the rear wheels 5 as a LIDAR whose monitoring range is a space to the right of the tractor 1.

The LIDAR, for example, measures the distances between the LIDAR and one million points or more within the monitoring range. At least one of the front monitor 51F and the back monitor 51B, however, may be a monocular camera, a stereo camera, a millimeter wave radar, a laser radar, a laser scanner, a distance image camera, a laser range finder, or the like. The same applies to the side monitor.

The monitoring range RF of the front monitor 51F desirably includes the roadbed BS and features AP outside the roadbed BS, so that the height (depth) of the surface of the roadbed BS relative to a predetermined point on the features AP, which is not covered with a newly constructed pavement NP after the newly constructed pavement NP is laid on the roadbed BS, can be derived. The same applies to the monitoring range of the side monitor. According to this embodiment, the monitoring range RF is wider than the roadbed BS. The features AP are L type gutter blocks. The features AP may be features other than L type gutter blocks, such as existing pavements or curbs, to the extent that the features can serve as a reference for the height of the surface of the roadbed BS.

The monitoring range RB of the back monitor 51B desirably includes the newly constructed pavement NP and the features AP outside the newly constructed pavement NP, so that the height of the surface of the newly constructed pavement NP relative to a predetermined point on the features AP, which is not covered with the newly constructed pavement NP, can be derived. According to this embodiment, the monitoring range RB is wider than the newly constructed pavement NP.

The front monitor 51F may include a positioning device and an inertial measurement unit in order to detect the position and the pose of the front monitor 51F. The positioning device is, for example, a GNSS receiver. The same applies to the back monitor 51B and the side monitor.

The travel speed sensor 51S is configured to be able to detect the travel speed of the asphalt finisher 100. According to this embodiment, the travel speed sensor 51S is a wheel speed sensor, and is configured to be able to detect the rotational angular velocity and the rotation angle of the rear wheels 5 and thus the travel speed and the travel distance of the asphalt finisher 100.

The information obtaining device 51 may also include a positioning device configured to be able to detect the position of the asphalt finisher 100, a steering angle sensor configured to be able to detect the steering angle of the asphalt finisher 100, and a pavement width sensor configured to be able to detect the amount of extension of the rear screeds 31 to calculate the width of a pavement.

An in-vehicle display 52 is configured to be able to display information on the asphalt finisher 100. According to this embodiment, the in-vehicle display 52 is a liquid crystal display installed in front of the operator seat 1S. The in-vehicle display 52, however, may be installed at one or both of the left end and the right end of the screed 3.

Figure 3:
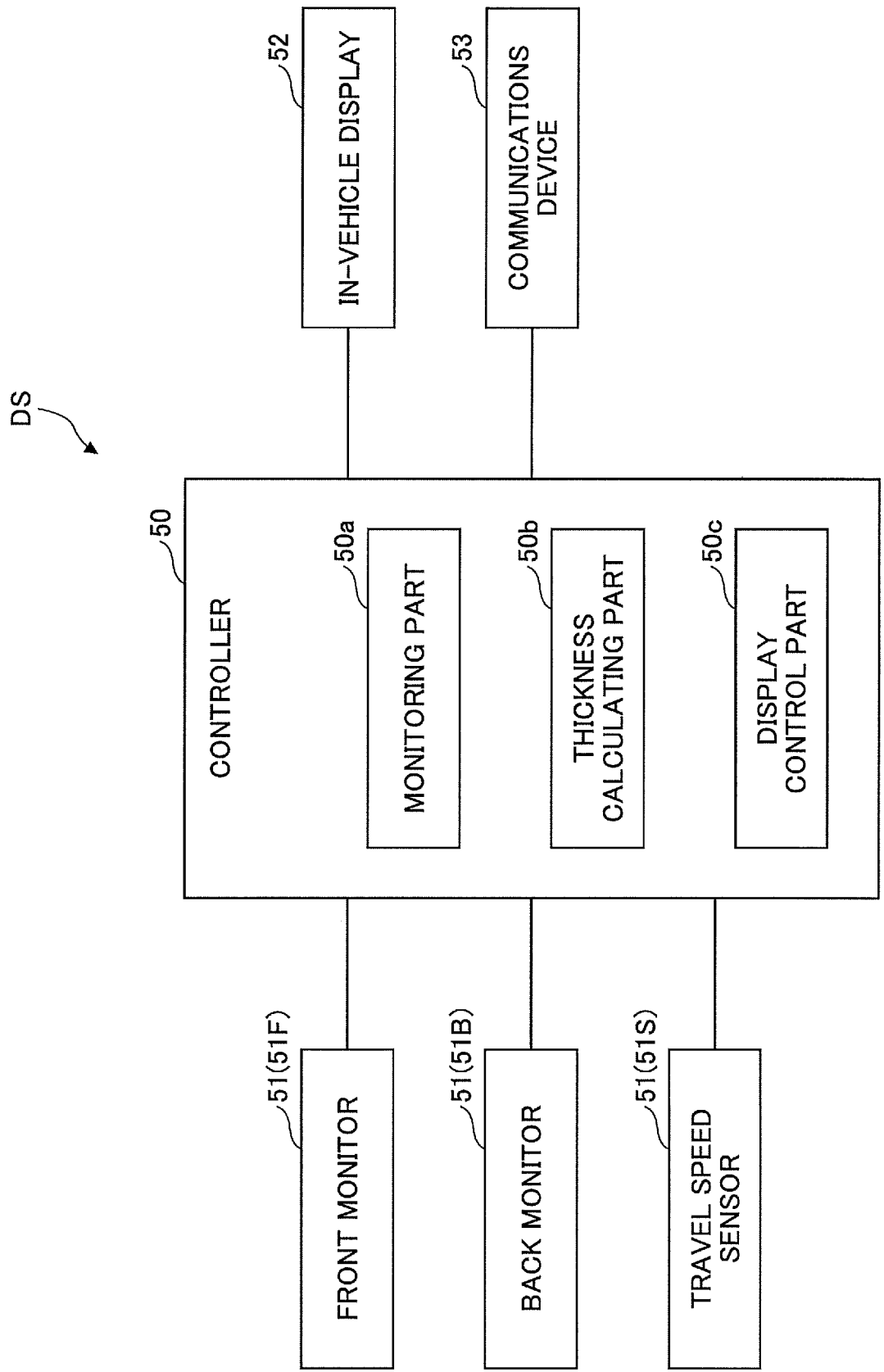
FIG. 3 is a diagram illustrating an example configuration of a display system.

A communications device 53 is configured to be able to control communications between the asphalt finisher 100 and an apparatus outside the asphalt finisher 100. According to this embodiment, the communications device 53 is installed in front of the operator seat 1S and is configured to be able to control communications through a mobile communication network, a short-range radio communication network, or a satellite communication network Next, an example configuration of a display system DS installed in the asphalt finisher 100 is described with reference to FIG. 3. FIG. 3 is a block diagram illustrating an example configuration of the display system DS.

The display system DS is constituted mainly of the controller 50, the front monitor 51F, the back monitor 51B, the travel speed sensor 51S, the in-vehicle display 52, the communications device 53, etc.

The controller 50 includes a monitoring part 50a, a thickness calculating part 50b, and a display control part 50c as functional elements. The monitoring part 50a, the thickness calculating part 50b, and the display control part 50c are separately illustrated for the convenience of description, but do not have to be physically separated and may be entirely or partly composed of a common software component or hardware component.

The monitoring part 50a is configured to be able to monitor the occurrence of a predetermined event. The predetermined event includes, for example, the start of a dump truck supplying the paving material PV into the hopper 2. According to this embodiment, the monitoring part 50*a* monitors, based on the output of the front monitor 51F, whether a bed raising operation has been performed by a dump truck contacting the asphalt finisher 100 via a push roller 2*b* (see FIG. 1).

Specifically, the monitoring part 50*a* determines that a bed raising operation has been performed in response to detecting the rise of the bed of the dump truck based on the output of the front monitor 51F.

In response to determining that a bed raising operation has been performed, the monitoring part 50*a* stores information on the position of the asphalt finisher 100 at this time in the nonvolatile storage, in order to make it possible to calculate a distance that the asphalt finisher 100 travels until the next supply of the paving material PV into the hopper 2.

The information on the position of the asphalt finisher 100 is, for example, the output information of the travel speed sensor 51S. For example, the monitoring part 50*a* can calculate the rotation angle of the rear wheels 5 and the travel distance of the asphalt finisher 100 after determining that a bed raising operation has been performed, based on the rotational position of the rear wheels 5 at the time of determining that a bed raising operation has been performed and the current rotational position of the rear wheels 5.

The information on the position of the asphalt finisher 100 may be the output information of a positioning device such as a GNSS receiver. This is because the monitoring part 50*a* can calculate the travel distance of the asphalt finisher 100 after determining that a bed raising operation has been performed, based on the output of the positioning device at the time of determining that a bed raising operation has been performed and the current output of the positioning device.

The thickness calculating part 50*b* is configured to be able to calculate the thickness of the newly constructed pavement NP. According to this embodiment, the thickness calculating part 50*b* derives the distance between a predetermined part of an L type gutter block serving as a reference in laying the newly constructed pavement NP and the surface of the roadbed BS (hereinafter "first vertical distance") as the thickness of the newly constructed pavement NP, based on the output of the front monitor 51F. In this case, the first vertical distance is a distance in a direction vertical to the surface of the roadbed BS, and the predetermined part of the L type gutter block is at a position higher than the surface of the roadbed BS.

The thickness calculating part 50*b* may also derive a distance obtained by adding the distance between the predetermined part of the L type gutter block serving as a reference in laying the newly constructed pavement NP and the surface of the newly constructed pavement NP (hereinafter "second vertical distance") to the first vertical distance, as the thickness of the newly constructed pavement NP, based on the output of the back monitor 51B. In this case, the second vertical distance is a distance in a direction vertical to the surface of the newly constructed pavement NP, and the predetermined part of the L type gutter block is at a position lower than the surface of the newly constructed pavement NP.

The thickness calculating part 50*b* may also derive the thickness of the newly constructed pavement NP based on the output of the side monitor.

The thickness calculating part 50*b* may also derive the thickness of the newly constructed pavement NP based on the surface of the roadbed BS in a reference coordinate system derived from the output of the front monitor 51F and on the surface of the newly constructed pavement NP in the reference coordinate system derived from the output of the back monitor 51B. The reference coordinate system is, for example, the world geodetic system. The world geodetic system is a three-dimensional XYZ Cartesian coordinate system with the origin at the center of mass of the Earth, the X-axis oriented toward the point of intersection of the prime meridian and the equator, the Y-axis oriented toward 90 degrees east longitude, and the Z-axis oriented toward the Arctic pole. Specifically, the thickness calculating part 50*b* derives the height of the surface of the roadbed BS in the reference coordinate system through conversion between a local coordinate system with respect to the front monitor 51F and the reference coordinate system. Furthermore, the thickness calculating part 50*b* derives the height of the surface of the newly constructed pavement NP through conversion between a local coordinate system with respect to the back monitor 51B and the reference coordinate system.

The display control part 50*c* is configured to be able to control information displayed on a display. The display includes the in-vehicle display 52 mounted the tractor 1, an in-vehicle display installed in a dump truck, a display belonging to a management apparatus installed in a management center, a display belonging to an assist device such as a smartphone carried by a related person, etc. Examples of related persons include the operator of the asphalt finisher 100 and a worker working around the asphalt finisher 100. In the case of displaying information on the display belonging to the management apparatus or the assist device, the display control part 50*c* transmits information to the management apparatus or the assist device via the communications device 53.

According to this embodiment, the display control part 50*c* displays a road map on the in-vehicle display 52. The road map is a graphic related to a road that the asphalt finisher 100 lays. The road map is, for example, an image that represents a plan view of a road, and is prestored in the nonvolatile storage. The road map may be dynamically rendered based on road design data prestored in the nonvolatile storage or the like.

The display control part 50*c* is also configured to be able to display information on a future event on the road map, based on information on the pavement of a road. According to this embodiment, the display control part 50*c* displays information on a future event on the road map, based on information on the pavement of a road obtained by the information obtaining device 51.

Examples of the "information on the pavement of a road" include a time at which a dump truck starts supplying the paving material PV into the hopper 2 (the time of the start of a bed raising operation) and the position of the asphalt finisher 100 at the time.

Examples of the "future event" include the start of the next supply of the paving material PV into the hopper 2 by a dump truck and the using up of the paving material PV in the hopper 2.

Examples of the "information on a future event" include the time of the next supply of the paving material PV into the hopper 2 by a dump truck, a time at which the paving material PV in the hopper 2 is used up, and the positions of the asphalt finisher 100 at those times.

For example, the display control part 50*c* derives the distance between a first point at which the first supply of the paving material PV into the hopper 2 by a dump truck is started and a second point at which the second supply of the paving material PV into the hopper 2 by a dump truck is started as a pavement distance D. The display control part 50*c* derives the length of an unconstructed pavement to be formed with a dump truck load of the paving material PV (hereinafter "estimated length L") based on the pavement distance D.

The first point is, for example, the output of the positioning device at the time when the monitoring part 50*a* determines that the first bed raising operation by the first dump truck has been performed (hereinafter, "the first point of time"). The second point is, for example, the output of the positioning device at the time when the monitoring part 50*a* determines that the first bed raising operation by the second dump truck has been performed (hereinafter, "the second point of time"). The same applies to third and subsequent points. The second dump truck is typically a dump truck different from the first dump truck, but may be the same first dump truck. According to this example, each dump truck is loaded with the same amount of the paving material PV.

The monitoring part 50*a* may distinguish between the first dumping operation performed by the second dump truck and the second or subsequent dumping operation performed by the first dump truck by, for example, recognizing a registration number on the license plate of each dump truck. This is for preventing the second or subsequent bed raising operation performed by the first dump truck from being wrongly recognized as the first bed raising operation performed by the second dump truck.

The display control part 50*c*, for example, may directly adopt the pavement distance D between the first point and the second point as the estimated length L or may adopt a value derived from the pavement distance D, such as a value obtained by adding a predetermined value to the pavement distance D, as the estimated length L.

The display control part 50*c* may calculate the estimated length L based on multiple pavement distances D. The display control part 50*c*, for example, may calculate the average of a pavement distance D1 between the first point and the second point and a pavement distance D2 between the second point and the third point as the estimated length L. The display control part 50*c* may also calculate the average of three or more pavement distances as the estimated length L or may calculate other statistical values determined from multiple pavement distances as the estimated length L. Examples of other statistical values may include a maximum, a minimum, and an intermediate value.

The display control part 50*c* derives the position of the asphalt finisher 100 at the time of the third supply of the paving material PV into the hopper 2 to be made by the third dump truck (hereinafter "estimated third point") based on the estimated length L.

The display control part 50*c*, for example, may calculate the thickness of the newly constructed pavement NP in the section between the second point and the third point based on the pavement distance D1 between the first point and the second point, the thickness of the newly constructed pavement NP in that section, and the pavement distance D2 between the second point and the third point.

For example, when the width and the thickness of an unconstructed pavement that is a pavement to be laid are equal to the width and the thickness of the newly constructed pavement NP that is a pavement laid between the first point and the second point, the display control part 50*c* may derive a point ahead of the second point by the estimated length L in the traveling direction as the estimated third point. In this case, the width of the unconstructed pavement may be, for example, a value included in the road design data prestored in the nonvolatile storage or the like. The width of the newly constructed pavement NP may be a value included in the road design data or may be a value based on the output of the pavement width sensor. The thickness of the newly constructed pavement NP may be, for example, a value calculated by the thickness calculating part 50*b*. The thickness of the unconstructed pavement may be, for example, a set value that may be set by the operator of the asphalt finisher 100.

The display control part 50*c* may derive a point of time at which the asphalt finisher 100 is to arrive at the estimated third point (hereinafter "estimated third time") based on the estimated length L and the travel speed of the asphalt finisher 100. The estimated third time corresponds to a time at which the paving material PV supplied by the second dump truck is to be used up.

The display control part 50*c* may derive remaining time before the arrival of the asphalt finisher 100 at the estimated third point.

Based on this, the display control part 50*c* causes a part of the road map corresponding to the estimated third point to be displayed in such a manner as to be distinguishable from another part of the road map. Furthermore, the display control part 50*c* may cause the estimated third time to be displayed in association with the part of the road map corresponding to the estimated third point.

The display control part 50*c* may calculate the volume of the newly constructed pavement NP laid between the first point and the second point. The display control part 50*c*, for example, may calculate the volume of the newly constructed pavement NP as the volume of an unconstructed pavement to be formed with a dump truck load of the paving material PV (hereinafter "estimated volume V"), based on the thickness of the newly constructed pavement NP calculated by the thickness calculating part 50*b*, the pavement distance D between the first point and the second point, and the width of the newly constructed pavement NP detected by the pavement width sensor. The display control part 50*c* may calculate the estimated length L of the unconstructed pavement based on the estimated volume V, the width, and the thickness of the unconstructed pavement.

The display control part 50*c* may calculate pavement speed (meter per minute) that is a pavement distance per unit time based on the pavement distance D (meter) between the first point and the second point and a pavement time T (minute) required to pave the pavement distance D. The display control part 50*c* may calculate time required before completing the laying of an unconstructed pavement, a time at which the laying of an unconstructed pavement is to be completed, or the like, based on the length of the unconstructed pavement and the pavement speed. In this case, the length of the unconstructed pavement may be the distance along a road between a current position and a position at which the next supply of the paving material PV into the hopper 2 is to be made by a dump truck or the distance along a road between a current position and the end point of a planned pavement section.

The display control part 50*c* may calculate the weight of the paving material PV remaining in the asphalt finisher 100 based on the weight of the paving material PV loaded in a dump truck and the weight of the newly constructed pavement NP laid by the asphalt finisher 100 using the paving material PV. In this case, the "weight of the paving material PV loaded in a dump truck" may be, for example, a value measured using a truck scale installed in an asphalt plant. The "weight of the newly constructed pavement NP laid by the asphalt finisher 100 using the paving material PV" may be, for example, the value of the product of the thickness, the width, and the density of the newly constructed pavement NP laid after the first point of time. The thickness of the newly constructed pavement NP may be, for example, a value calculated by the thickness calculating part 50*b*. The width of the newly constructed pavement NP may be, for example, a value based on the output of the pavement width sensor. The length of the newly constructed pavement NP may be, for example, a value based on the output of the travel speed sensor 51S. The density of the newly constructed pavement NP may be, for example, a value based on the output of a pavement density measuring instrument using electromagnetic waves.

The display control part 50*c* may cause information on a dump truck obtained through the communications device 53 to be displayed on the display. The information on a dump truck may be, for example, information on the delay of a dump truck. Specifically, the information on a dump truck may be an estimated time of arrival that is a time at which a dump truck is expected to arrive at a worksite, a difference between the initial scheduled time of arrival and the estimated time of arrival, or the like. For example, the display control part 50*c* receives information on the position of a moving dump truck through the communications device 53 and calculates the estimated time of arrival based on the distance between the current position of the dump truck and a worksite. The display control part 50*c* may also access an API (Application Programming Interface) related to route searching made publicly available on the Web through the communications device 53 to obtain information on time required to move from the current position of the moving dump truck to a worksite.

Thus, the display control part 50*c* can derive information on an unconstructed pavement that is a pavement whose construction is yet to be finished based on information on the newly constructed pavement NP that is a pavement whose construction is finished, and can display the derived information on the in-vehicle display 52 or the like. Therefore, a related person can place a timely order for the paving material PV. Furthermore, a related person can accurately specify the weight of the paving material PV to be ordered to avoid excess or deficiency.

Figure 4:
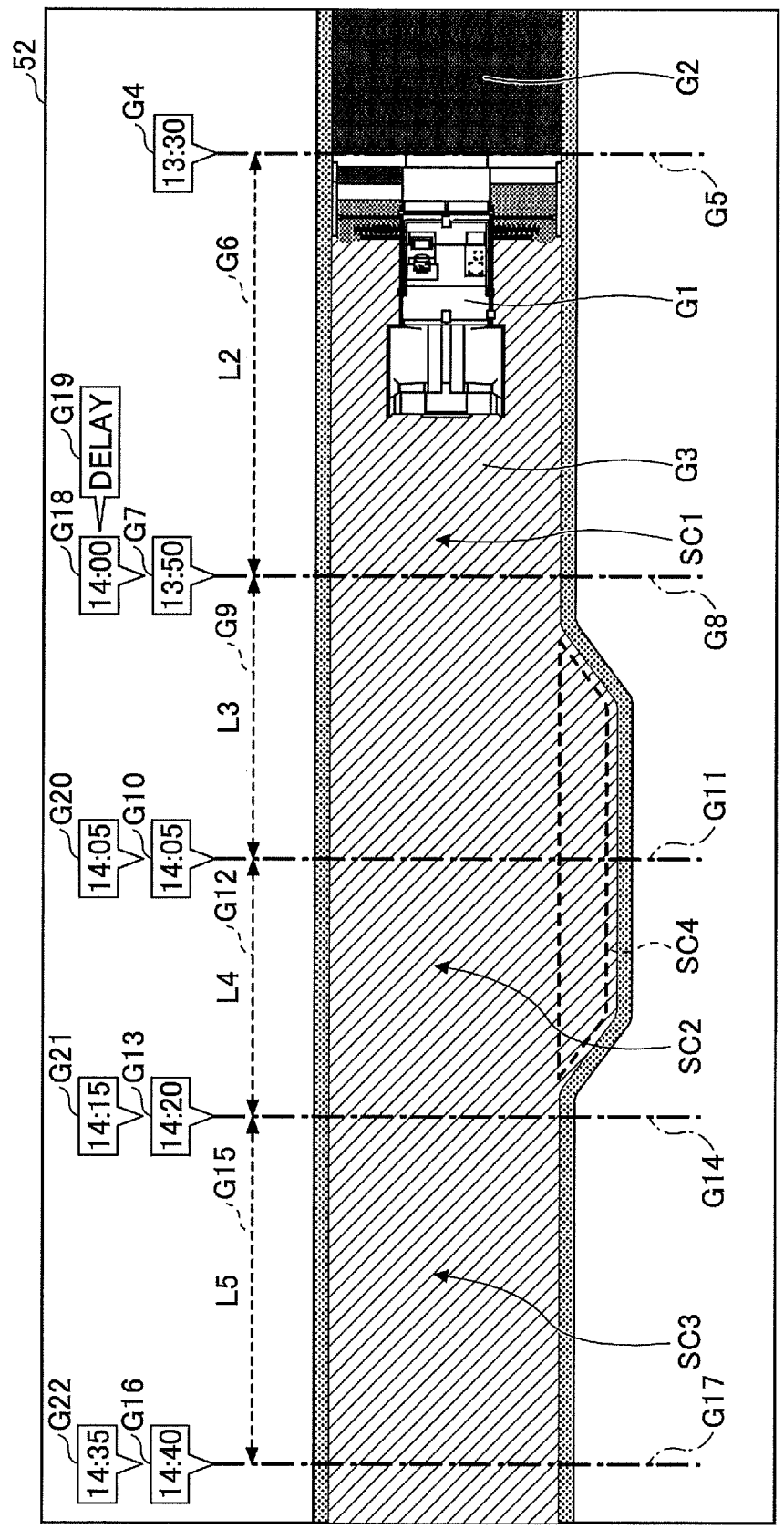
FIG. 4 is a diagram illustrating an example of an image displayed on a display.

Next, an example of an image that the display control part 50*c* causes to be displayed on the display is described with reference to FIG. 4. FIG. 4 is a diagram illustrating an example of an image displayed on the in-vehicle display 52.

The display control part 50*c* causes a road map to be displayed while the asphalt finisher 100 is in operation. According to the example of FIG. 4, the road map includes a first straight section SC1, a widening section SC2, and a second straight section SC3. The widening section SC2 includes a bus stop section SC4 enclosed by a dashed line.

Furthermore, the display control part 50*c* causes a vehicle graphic G1 to be displayed at a position on the road map corresponding to the current position of the asphalt finisher 100. The vehicle graphic G1 is, for example, a graphic representing the shape of the asphalt finisher 100 as viewed from directly above the asphalt finisher 100.

Furthermore, the display control part 50*c*, for example, causes a newly constructed pavement graphic G2 of a fine dot pattern to be displayed in an area on the road map corresponding to a space in which the newly constructed pavement NP is laid, and causes an unconstructed pavement graphic G3 of an oblique line pattern to be displayed in an area on the road map corresponding to a space in which the unconstructed pavement is to be laid.

Based on this, for example, when the monitoring part 50*a* detects a bed raising operation by a dump truck multiple times based on the output of the front monitor 51F, the display control part 50*c* calculates the estimated volume V that is the volume of an unconstructed pavement to be formed with a dump truck load of the paving material PV. According to the example of FIG. 4, for the simplification of description, the display control part 50*c* calculates the estimated volume V when a bed raising operation by the second dump truck is detected. Then, the display control part 50*c* calculates the estimated length L of the unconstructed pavement based on the estimated volume V, the width, and the thickness of the unconstructed pavement. Furthermore, based on the estimated length L, the display control part 50*c* derives estimated points that are the positions of the asphalt finisher 100 when the next and subsequent supplies of the paving material PV into the hopper 2 are to be made by the third and subsequent dump trucks. Then, the display control part 50*c* causes graphics G4 through G22 to be superimposed on the road map.

The graphic G4 is a balloon that represents a current time, and is correlated with the graphic G5. According to the example of FIG. 4, the current time "13:30" is the time of the detection of a bed raising operation performed by the second dump truck.

The graphic G5 is a one-dot chain line that represents the current position of the trailing end of the screed 3.

The graphic G6 is a dashed-line double-headed arrow that represents an estimated length L2 of an unconstructed pavement to be formed with the paving material PV supplied by the second dump truck.

The graphic G7 is a balloon that represents the time of the third supply of the paving material PV into the hopper 2 to be made by the third dump truck, and is correlated with the graphic G8. The example of FIG. 4 illustrates that a bed raising operation by the third dump truck is to be performed in 20 minutes at "13:50."

The graphic G8 is a one-dot chain line that represents the position of the trailing end of the screed 3 at the time of the third supply of the paving material PV.

The graphic G9 is a dashed-line double-headed arrow that represents an estimated length L3 of an unconstructed pavement to be formed with the paving material PV supplied by the third dump truck. According to the example of FIG. 4, the estimated length L3 is smaller than the estimated length L2 because a section in which the unconstructed pavement is to be laid includes the bus stop section SC4.

The graphic G10 is a balloon that represents the time of the fourth supply of the paving material PV into the hopper 2 to be made by the fourth dump truck, and is correlated with the graphic G11. The example of FIG. 4 illustrates that a bed raising operation by the fourth dump truck is to be performed in 35 minutes at "14:05."

The graphic G11 is a one-dot chain line that represents the position of the trailing end of the screed 3 at the time of the fourth supply of the paving material PV.

The graphic G12 is a dashed-line double-headed arrow that represents an estimated length L4 of an unconstructed pavement to be formed with the paving material PV supplied by the fourth dump truck. According to the example of FIG. 4, the estimated length L4 is smaller than the estimated length L2 because a section in which the unconstructed pavement is to be laid includes the bus stop section SC4.

The graphic G13 is a balloon that represents the time of the fifth supply of the paving material PV into the hopper 2 to be made by the fifth dump truck, and is correlated with the graphic G14. The example of FIG. 4 illustrates that a bed raising operation by the fifth dump truck is to be performed in 50 minutes at "14:20."

The graphic G14 is a one-dot chain line that represents the position of the trailing end of the screed 3 at the time of the fifth supply of the paving material PV.

The graphic G15 is a dashed-line double-headed arrow that represents an estimated length L5 of an unconstructed pavement to be formed with the paving material PV supplied by the fifth dump truck. According to the example of FIG. 4, the estimated length L5 is equal to the estimated length L2. This is because a section in which the unconstructed pavement is to be laid does not include the widening section SC2 and because the width of the unconstructed pavement to be formed with the paving material PV supplied by the second dump truck is equal to the width of the unconstructed pavement to be formed with the paving material PV supplied by the fifth dump truck.

The graphic G16 is a balloon that represents the time of the sixth supply of the paving material PV into the hopper 2 to be made by the sixth dump truck, and is correlated with the graphic G17. The example of FIG. 4 illustrates that a bed raising operation by the sixth dump truck is to be performed in 70 minutes at "14:40."

The graphic G17 is a one-dot chain line that represents the position of the trailing end of the screed 3 at the time of the sixth supply of the paving material PV.

The graphic G18 is a balloon that represents an estimated time of arrival at which the third dump truck is expected to arrive at the worksite, and is correlated with the graphic G7 and the graphic G8. The example of FIG. 4 illustrates that the third dump truck is expected to arrive at the worksite in 30 minutes at "14:00."

The graphic G19 is a balloon that represents the delay of the arrival of the third dump truck, and is correlated with the graphic G18. The example of FIG. 4 illustrates that the time of arrival of the third dump truck is expected to be later than the scheduled time of the third supply. Looking at the image illustrated in FIG. 4, the operator can be aware that the time of arrival of the third dump truck may be "14:00," ten minute later than the time of the third supply scheduled at "13:50." Thus, when a dump truck is expected to arrive at a worksite later than the scheduled time of a bed raising operation (the supply of the paving material PV into the hopper 2), the display control part 50c can so notify the operator of the asphalt finisher 100 by displaying a graphic that represents the delay of the arrival of the dump truck.

The graphic G20 is a balloon that represents an estimated time of arrival at which the fourth dump truck is expected to arrive at the worksite, and is correlated with the graphic G10 and the graphic G11. The example of FIG. 4 illustrates that the fourth dump truck is expected to arrive at the worksite in 35 minutes at "14:05." Looking at the image illustrated in FIG. 4, the operator can be aware that the time of the fourth supply scheduled at "14:05" may coincide with the time of arrival of the fourth dump truck.

The graphic G21 is a balloon that represents an estimated time of arrival at which the fifth dump truck is expected to arrive at the worksite, and is correlated with the graphic G13 and the graphic G14. The example of FIG. 4 illustrates that the fifth dump truck is expected to arrive at the worksite in 45 minutes at "14:15." Looking at the image illustrated in FIG. 4, the operator can be aware that the time of arrival of the fifth dump truck is "14:15," five minute earlier than the time of the fifth supply scheduled at "14:20."

The graphic G22 is a balloon that represents an estimated time of arrival at which the sixth dump truck is expected to arrive at the worksite, and is correlated with the graphic G16 and the graphic G17. The example of FIG. 4 illustrates that the sixth dump truck is expected to arrive at the worksite in 65 minutes at "14:35." Looking at the image illustrated in FIG. 4, the operator can be aware that the time of arrival of the sixth dump truck is "14:35," five minute earlier than the time of the sixth supply scheduled at "14:40."

In the case of determining that the total amount of the paving material PV necessary for actual construction can be smaller than expected, the operator of the asphalt finisher 100 may notify a dump truck operator, a related person in a management company, or the like, through the controller 50 and the communications device 53, to reduce the total amount of the paving material PV to be transported to the worksite from the scheduled total amount. For example, the asphalt finisher 100 may be configured such that the operator can notify a related person how much the total amount of the paving material PV is to be reduced by performing a predetermined input operation through an input device such as a touchscreen belonging to the in-vehicle display 52. The notified related person can take measures such as reducing the number of dump trucks to transport the paving material PV to the worksite from a scheduled number or reducing the amount of the paving material PV transported by each dump truck. Such measures may be automatically taken by a management apparatus such as a computer that receives a notification. The same is true for the case of determining that the total amount of the paving material PV necessary for actual construction is going to be larger than expected, namely, the case of determining that the total amount of the paving material PV as estimated is going to be insufficient. Thus, even when the operator of the asphalt finisher 100 becomes aware of a mismatch between the total amount of the paving material PV necessary for actual construction and the total amount of the paving material PV as estimated after the start of construction, the operator can easily notify a related person, a management apparatus, or the like how much the total amount of the paving material PV to be transported to the worksite is to be increased or decreased.

Figure 5:
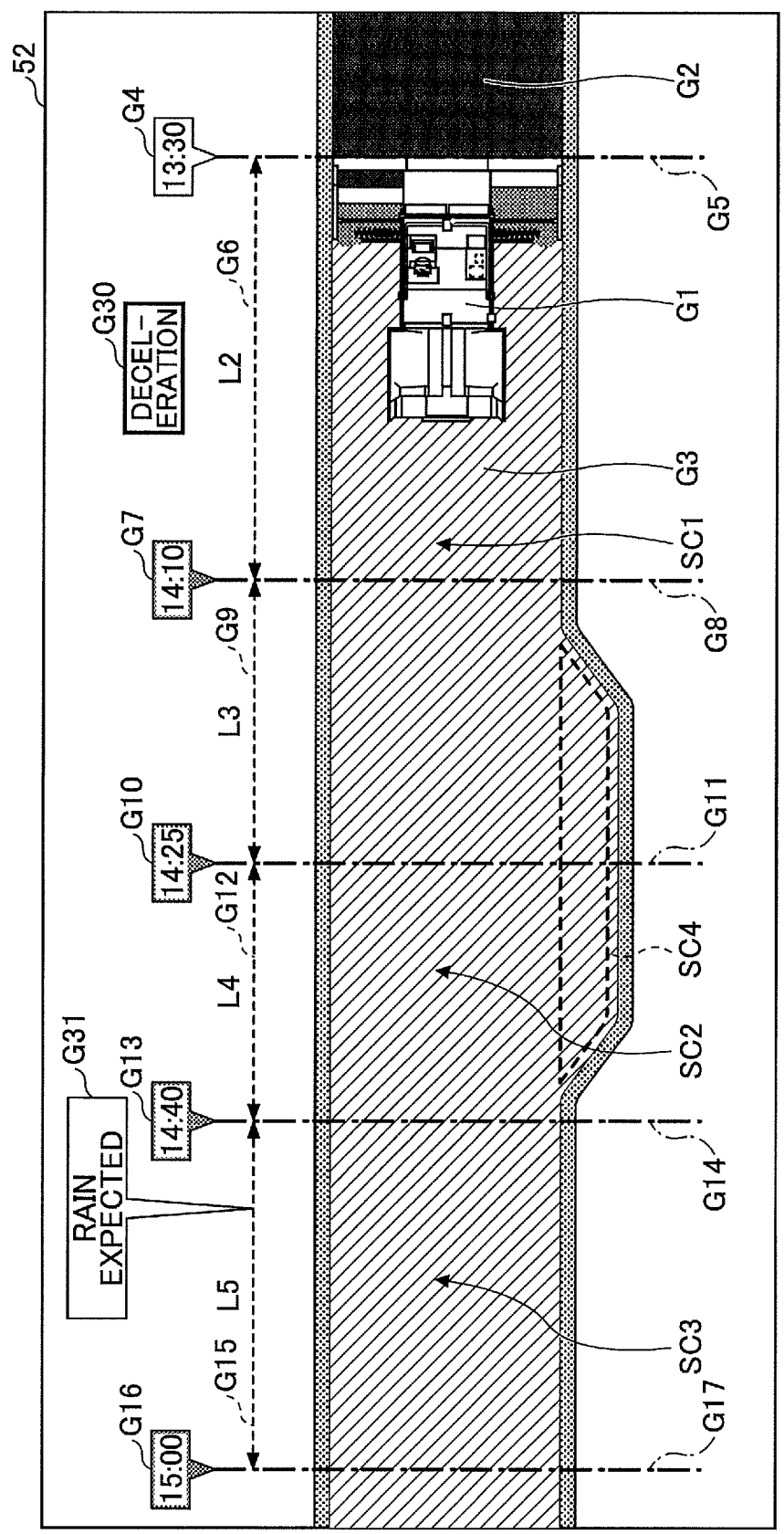
FIG. 5 is a diagram illustrating another example of the image displayed on the display.

Next, another example of an image that the display control part 50c causes to be displayed on the display is described with reference to FIG. 5. FIG. 5 is a diagram illustrating another example of an image displayed on the in-vehicle display 52.

The image illustrated in FIG. 5 is different from the image illustrated in FIG. 4 in including graphics G30 and G31 and not including the graphics G18 through G22 from, but is otherwise equal to the image illustrated in FIG. 4. Therefore, a description of a common portion is omitted and differences are described in detail.

The graphic G30 is a text box indicating the state of the asphalt finisher 100, showing that the asphalt finisher 100 has decelerated. For example, the graphic G30 is displayed when the operator of the asphalt finisher 100 has decelerated the asphalt finisher 100, becoming aware that the third dump truck heading toward the worksite is going to be delayed by a traffic jam.

In response to the deceleration of the asphalt finisher 100, the display control part 50c recalculates the timing of each of the third and subsequent supplies of the paving material PV into the hopper 2 to be made by the third and subsequent dump trucks.

FIG. 5 illustrates that the third supply initially scheduled at "13:50" is postponed to "14:10," using the graphic G7. Likewise, FIG. 5 illustrates that the fourth supply initially scheduled at "14:05" is postponed to "14:25," using the graphic G10, that the fifth supply initially scheduled at "14:20" is postponed to "14:40," using the graphic G13, and that the sixth supply initially scheduled at "14:40" is postponed to "15:00," using the graphic G16. In this case, the display control part 50c may be configured to add a rough dot pattern to the graphics G7, G10, G13 and G16, which are balloons representing the respective times of the affected third and subsequent supplies as illustrated in FIG. 5. This is for making a related person aware that there is a delay in the timing of the supply of the paving material PV.

The graphic G31 is a balloon that represents information on a change in a work environment. According to the example of FIG. 5, the graphic G31 indicates that rain is expected at "14:45." For example, the display control part 50c obtains information about the weather via the communications device 53.

Looking at the image of FIG. 5, a related person can, for example, cancel the order for the paving material PV placed for the fifth supply scheduled at "14:40" and decide to terminate laying and leveling work at "14:40," in order to end the laying and leveling work before it starts to rain.

The same applies to the case of accelerating the asphalt finisher 100. For example, when rain is expected, the operator of the asphalt finisher 100 may accelerate the asphalt finisher 100 in order to complete laying and leveling work before it starts to rain.

In this case, in response to the acceleration of the asphalt finisher 100, the display control part 50c causes the graphic G30 that indicates that the asphalt finisher 100 has been accelerated to be displayed. Then, the display control part 50c recalculates the timing of each of the third and subsequent supplies of the paving material PV into the hopper 2 to be made by the third and subsequent dump trucks.

The display control part 50c may cause changes in the supply timing in the case of accelerating the asphalt finisher 100 to be displayed, before the asphalt finisher 100 is actually accelerated, in order that the operator can be aware beforehand of the relationship between the degree of acceleration and the amount of time to be saved. The same applies to the case of decelerating the asphalt finisher 100.

According to the above-described configuration, the display system DS can predict a future event based on information on road pavement obtained by the information obtaining device 51 and cause information on the event to be displayed on a road map.

Next, another example configuration of the display system DS installed in the asphalt finisher 100 is described with reference to FIG. 6. FIG. 6 is a block diagram illustrating another example configuration of the display system DS.

The display system DS of FIG. 6 is different from the display system DS of FIG. 3 in that the back monitor 51B and the thickness calculating part 50b are omitted, but is otherwise equal to the display system DS of FIG. 3. Therefore, a description of a common portion is omitted and differences are described in detail.

According to the display system DS of FIG. 6, the display control part 50c derives the estimated length L that is the length of an unconstructed pavement to be famed with a dump truck load of the paving material PV, without calculating the thickness of the newly constructed pavement NP.

Specifically, the display control part 50c is configured to be able to the estimated length L without calculating the volume of the newly constructed pavement NP, namely, without calculating the estimated volume V that is the volume of an unconstructed pavement to be formed with a dump truck load of the paving material PV.

More specifically, for example, when it can be determined that the thickness and the width of an unconstructed pavement are equal to the thickness and the width of the newly constructed pavement NP, the display control part 50c derives the pavement distance D between the first point and the second point as the estimated length L.

For example, the position coordinates of the first point are determined by the output of the positioning device when the monitoring part 50a determines that a first bed raising operation by the first dump truck has been performed. Likewise, the position coordinates of the second point are determined by the output of the positioning device when the monitoring part 50a determines that a first bed raising operation by the second dump truck has been performed. The display control part 50c can derive the pavement distance D between the first point and the second point from the position coordinates of the first point and the position coordinates of the second point.

The display control part 50c may also derive the pavement distance D based on a difference DF between the output of the travel speed sensor 51S when the asphalt finisher 100 is at the first point and the output of the travel speed sensor 51S when the asphalt finisher 100 is at the second point.

The "output of the travel speed sensor 51S when the asphalt finisher 100 is at the first point" is, for example, the output of the travel speed sensor 51S when the monitoring part 50a determines that a first bed raising operation by the first dump truck has been performed. Furthermore, the "output of the travel speed sensor 51S when the asphalt finisher 100 is at the second point" is, for example, the output of the travel speed sensor 51S when the monitoring part 50a determines that a first bed raising operation by the second dump truck has been performed.

The difference DF corresponds to the rotation angle of the rear wheels 5 during the travel of the asphalt finisher 100 from the first point to the second point.

The display control part 50c may also calculate the estimated length 1 based on multiple pavement distances D. The display control part 50c, for example, may calculate the average of the pavement distance D1 between the first point and the second point and the pavement distance D2 between the second point and the third point as the estimated length L. The display control part 50c may also calculate the average of three or more pavement distances as the estimated length L or may calculate other statistical values determined from multiple pavement distances as the estimated length L. Examples of other statistical values may include a maximum, a minimum, and an intermediate value.

When it can be determined that the thickness of an unconstructed pavement is equal to the thickness of the newly constructed pavement NP, the display control part 50c may calculate the surface area of the newly constructed pavement NP as an estimated area S. The estimated area S is the surface area of an unconstructed pavement to be famed with a dump truck load of the paving material PV. Specifically, the display control part 50c may calculate the surface area of the newly constructed pavement NP as the estimated area S, based on the pavement distance D between the first point and the second point and the width of the newly constructed pavement NP detected by the pavement width sensor. The display control part 50c may calculate the estimated length L based on the estimated area S and the width of the unconstructed pavement.

According to this configuration, the display system DS of FIG. 6 can achieve the same effects as achieved by the display system DS of FIG. 3 with a simpler configuration than the display system DS of FIG. 3.

As described above, a display unit for a road machine according to an embodiment of the present invention includes, for example, the in-vehicle display 52 installed in the asphalt finisher 100, an in-vehicle display installed in a dump truck, a display belonging to a management apparatus connected via the communications device 53 installed in the asphalt finisher 100, or a display belonging to an assist device such as a smartphone connected via the communications device 53 installed in the asphalt finisher 100.

The asphalt finisher 100 serving as a road machine includes the tractor 1, the hopper 2 installed in front of the tractor 1 to receive the paving material PV, the conveyor CV configured to feed the paving material PV in the hopper 2 to the back side of the tractor 1, the screw SC configured to lay and spread the paving material PV fed by the conveyor CV behind the tractor 1, the screed 3 configured to lay and level the paving material PV laid and spread by the screw SC behind the screw SC, and the information obtaining device 51 configured to obtain information on road pavement.

The display unit for the asphalt finisher 100 predicts a future event based on the information on road pavement obtained by the information obtaining device 51, and displays information on the event on a road map.

According to this configuration, the display unit for the asphalt finisher 100 enables an operator to more accurately predict the progress of laying and leveling work.

The display unit for the asphalt finisher 100 may be configured to display the estimated length L, which is the length of an unconstructed pavement to be formed with the amount of the paving material PV carried by a single dump truck as a transportation vehicle, derived based on the pavement distance D. In this case, the pavement distance D is, for example, the distance between the first point where the supply of the paving material PV into the hopper 2 by a dump truck has been started and the second point where the next supply of the paving material PV into the hopper 2 by a dump truck has been started.

The display unit for the asphalt finisher 100 may also be configured to be able to display the estimated length L that is the length of an unconstructed pavement to be formed with a dump truck load of the paving material PV, derived based on the thickness, the width, and the length of the newly constructed pavement NP. According to this configuration, a related person can more accurately predict the progress of laying and leveling work. According to the actual laying and leveling work, the thickness of the newly constructed pavement NP may be determined to correspond to a reference height determined by the placement of an L type gutter block or the like. In this case, the thickness of the newly constructed pavement NP differs from the thickness determined determined in road design data, and the amount of the paving material PV necessary for finishing an unconstructed pavement also differs from the amount initially estimated. In contrast, the display unit for the asphalt finisher 100 can calculate and display the estimated length L of an unconstructed pavement based on the actual thickness of the newly constructed pavement NP. Therefore, the operator of the asphalt finisher 100 can be aware early on of a change in the amount of the paving material PV necessary for finishing an unconstructed pavement and take various measures such as adjusting the amount of the paving material PV to order.

The display unit for the asphalt finisher 100 may also be configured to be able to display at least one of the time of the start of the next supply of the paving material PV into the hopper 2 by a dump truck, time before the start of the next supply of the paving material PV into the hopper 2 by the dump truck, and a position at which the next supply of the paving material PV into the hopper 2 by the dump truck is started, which are derived based on the length of an unconstructed pavement to be formed with a dump truck load of the paving material PV and the travel speed of the asphalt finisher 100.

The display unit for the asphalt finisher 100 may also be configured to be able to display the estimated length L, which is the length of an unconstructed pavement to be formed with a dump truck load of the paving material PV, derived based on the volume of the newly constructed pavement NP and the width of the unconstructed pavement. In this case, the volume of the newly constructed pavement NP corresponds to the estimated volume V of the unconstructed pavement. According to this configuration, the display unit can more accurately derive the estimated length L of the unconstructed pavement even when the unconstructed pavement is wider or narrower than the newly constructed pavement NP.

The display unit for the asphalt finisher 100 may also be configured to be able to display a time at which rain is expected. According to this configuration, a related person can take measures for finishing laying and leveling work before it starts to rain or suspending laying and leveling work before it starts to rain. These measures include, for example, increasing and decreasing the travel speed of the asphalt finisher 100.

The display unit for the asphalt finisher 100 may also be configured to be able to update the display of at least one of the time of the start of the next supply of the paving material PV into the hopper 2 by a dump truck, time before the start of the next supply of the paving material PV into the hopper 2 by the dump truck, and a position at which the next supply of the paving material PV into the hopper 2 by the dump truck is started, in response to a change in the travel speed of the asphalt finisher 100. According to this configuration, a related person can more accurately predict the progress of laying and leveling work even when the travel speed of the asphalt finisher 100 is increased or decreased to respond to an unscheduled event such as the delay of the arrival of a dump truck.

An embodiment of the present invention is described above. The present invention, however, is not limited to the above-described embodiment. Various variations and substitutions may be applied to the above-described embodiment without departing from the scope of the present invention. Furthermore, the features described with reference to the above-described embodiment may be suitably combined to the extent that no technical contradiction is caused.

What is claimed is:

1. A display unit for a road machine, the road machine including a tractor, a hopper installed in front of the tractor to receive a paving material, a conveyor configured to feed the paving material in the hopper to a back side of the tractor, a screw configured to lay and spread the paving material fed by the conveyor behind the tractor, a screed configured to lay and level the paving material laid and spread by the screw behind the screw, and au information obtaining device configured to obtain information on road pavement, the display unit comprising:
   a display; and
   processing circuitry configured to predict a future event based on the information on the road pavement obtained by the information obtaining device, and to display information on the event on a road map on the display,
   wherein the processing circuitry is configured to derive a length of an unconstructed pavement to be formed with a transportation vehicle load of the paving material, based on a distance between a first point at which a supply of the paving material into the hopper by a transportation vehicle has been started and a second point at which a next supply of the paving material into the hopper by a transportation vehicle has been started, and to display the derived length on the display.

2. The display unit as claimed in claim 1, wherein the processing circuitry is configured to display a time at which rain is expected on the display.

3. A display unit for a road machine, the road machine including a tractor, a hopper installed in front of the tractor to receive a paving material, a conveyor configured to feed the paving material in the hopper to a back side of the tractor, a screw configured to lay and spread the paving material fed by the conveyor behind the tractor, a screed configured to lay and level the paving material laid and spread by the screw behind the screw, and an information obtaining device configured to obtain information on road pavement, the display unit comprising:
a display; and
processing circuitry configured to predict a future event based on the information on the road pavement obtained by the information obtaining device, and to display information on the event on a road map on the display,
wherein the processing circuitry is configured to derive a length of an unconstructed pavement to be formed with a transportation vehicle load of the paving material, based on a thickness, a width, and a length of a newly constructed pavement, and to display the derived length on the display.

4. The display unit as claimed in claim 3, wherein the processing circuitry is configured to display a time at which rain is expected on the display.

5. A display unit for a road machine, the road machine including a tractor, a hopper installed in front of the tractor to receive a paving material, a conveyor configured to feed the paving material in the hopper to a back side of the tractor, a screw configured to lay and spread the paving material fed by the conveyor behind the tractor, a screed configured to lay and level the paving material laid and spread by the screw behind the screw, and an information obtaining device configured to obtain information on road pavement, the display unit comprising:
a display; and
processing circuitry configured to predict a future event based on the information on the road pavement obtained by the information obtaining device, and to display information on the event on a road map on the display,
wherein the processing circuitry is configured to derive at least one of a time of a start of a next supply of the paving material into the hopper by a transportation vehicle, time before the start of the next supply of the paving material into the hopper by the transportation vehicle, and a position at which the next supply of the paving material into the hopper by the transportation vehicle is started, based on a length of an unconstructed pavement to be formed with a transportation vehicle load of the paving material and a travel speed of the road machine, and to display the derived at least one of the time of the start of the next supply, the time before the next supply, and the position on the display.

6. The display unit as claimed in claim 5, wherein the processing circuitry is configured to display a time at which rain is expected on the display.

7. A display unit for a road machine, the road machine including a tractor, a hopper installed in front of the tractor to receive a paving material, a conveyor configured to feed the paving material in the hopper to a back side of the tractor, a screw configured to lay and spread the paving material fed by the conveyor behind the tractor, a screed configured to lay and level the paving material laid and spread by the screw behind the screw, and an information obtaining device configured to obtain information on road pavement, the display unit comprising:
a display; and
processing circuitry configured to predict a future event based on the information on the road pavement obtained by the information obtaining device, and to display information on the event on a road map on the display,
wherein the processing circuitry is configured to derive a length of an unconstructed pavement to be formed with a transportation vehicle load of the paving material, based on a volume of a newly constructed pavement and a width of the unconstructed pavement, and to display the derived length on the display.

8. The display unit as claimed in claim 7, wherein the processing circuitry configured to display a time at which rain is expected on the display.

9. A display unit for a road machine, the road machine including a tractor, a hopper installed in front of the tractor to receive a paving material, a conveyor configured to feed the paving material in the hopper to a back side of the tractor, a screw configured to lay and spread the paving material fed by the conveyor behind the tractor, a screed configured to lay and level the paving material laid and spread by the screw behind the screw, and an information obtaining device configured to obtain information on road pavement, the display unit comprising:
a display; and
processing circuitry configured to predict a future event based on the information on the road pavement obtained by the information obtaining device, and to display information on the event on a road map on the display,
wherein the processing circuitry is configured to update a display of at least one of a time of a start of a next supply of the paving material into the hopper by a transportation vehicle, time before the start of the next supply of the paving material into the hopper by the transportation vehicle, and a position at which the next supply of the paving material into the hopper by the transportation vehicle is started, in response to a change in a travel speed of the road machine.

10. The display unit as claimed in claim 9, wherein the processing circuitry is configured to display a time at which rain is expected on the display.

* * * * *